(12) United States Patent
Moffett et al.

(10) Patent No.: US 7,117,962 B2
(45) Date of Patent: Oct. 10, 2006

(54) ARTICULATED FORKLIFT TRUCK

(75) Inventors: Robert Moffett, Clontibret (IE); Gerry McHugh, Carrickmacross (IE); Joe O'Brien, Castleblaney (IE); Gary Harte, Castleblaney (IE); Martin McVicar, Emyvale (IE)

(73) Assignee: Aisle-Master Limited, (IE)

( * ) Notice: Subject to any disclaimer, the term of this patent is extended or adjusted under 35 U.S.C. 154(b) by 96 days.

(21) Appl. No.: 10/494,974

(22) PCT Filed: Oct. 3, 2001

(86) PCT No.: PCT/IE01/00126

§ 371 (c)(1),
(2), (4) Date: Dec. 6, 2004

(87) PCT Pub. No.: WO03/029129

PCT Pub. Date: Apr. 10, 2003

(65) Prior Publication Data

US 2005/0092531 A1    May 5, 2005

(51) Int. Cl.
*B62D 11/00* (2006.01)
(52) U.S. Cl. .............. 180/6.48; 180/6.5; 180/305; 180/212
(58) Field of Classification Search ........... 180/6.48, 180/6.24, 6.5, 6.62, 6.64, 305, 307, 308, 180/212; 414/633, 635
See application file for complete search history.

(56) References Cited

U.S. PATENT DOCUMENTS

| 2,774,434 | A | * | 12/1956 | Ferris ................... 180/6.3 |
| 3,515,300 | A | * | 6/1970 | Hollenbach ............. 414/633 |
| 3,901,339 | A | * | 8/1975 | Williamson ............. 180/6.48 |
| 4,157,125 | A | * | 6/1979 | Bushell et al. .......... 180/212 |
| 4,325,442 | A | * | 4/1982 | Groenig ................. 180/6.48 |
| 5,312,219 | A |   | 5/1994 | Brown ................... 414/633 |
| 6,116,843 | A | * | 9/2000 | Braud ................... 414/665 |
| 6,913,102 | B1 | * | 7/2005 | Sugata et al. ........... 180/253 |
| 2003/0132038 | A1 | * | 7/2003 | Callan et al. ........... 180/6.24 |
| 2003/0209371 | A1 | * | 11/2003 | Brown ................... 180/6.64 |

FOREIGN PATENT DOCUMENTS

| EP | 0855362 | 4/1998 |
| GB | 2265344 | 9/1993 |

\* cited by examiner

*Primary Examiner*—Tony Winner
(74) *Attorney, Agent, or Firm*—Van Dyke, Gardner, Linn & Burkhart, LLP

(57) ABSTRACT

An articulated forklift truck for use in narrow aisles comprises a front chassis section (10) having a first pair of ground-engaging wheels (20) and a rear chassis section (12) having a second pair of ground-engaging wheels (22). The front chassis section (10) carries a mast (16) and lift forks (18) and is pivoted to the rear chassis section (12) about a substantially vertical axis (14) to allow the truck to be steered. Both front wheels (20) but only one of the rear wheels (22) are driven by electric of hydrostatic motors (24, 26).

9 Claims, 4 Drawing Sheets

ARTICULATED FORKLIFT TRUCK

FIELD OF THE INVENTION

This invention relates to an articulated forklift truck, especially of the kind designed for use in narrow aisles.

BACKGROUND TO THE INVENTION

A typical narrow-aisle articulated forklift truck comprises front and rear chassis sections each having a pair of wheels on a respective common axis. The rear wheels are driven, while the front wheels are non-driven. The chassis sections are pivoted together about a vertical axis so that the front chassis section can be turned at an angle at or approaching 90° relative to the rear chassis section to allow the truck to insert loads into, and remove loads from, the face of the aisle, i.e. normal to the length of the aisle.

Clearly, as the steering angle increases the inner rear wheel, i.e. the wheel on the inside of the path taken by the truck, will turn more slowly than the outer rear wheel, and in fact may stop altogether or reverse if the axis of the front wheels coincides with or lies inside the ground contact point of the inner rear wheel at large steering angles. In conventional narrow-aisle articulated forklift trucks this leads to tyre wear and difficulties in manoeuvring and controlling the truck. At large steering angles, too, the rear driving wheels will tend to drive the forklift straight ahead (this is known as "dozing on"), with the front wheels skidding sideways.

It is an object of this invention to provide a construction of forklift truck in which this problem is avoided or mitigated.

SUMMARY OF THE INVENTION

Accordingly to the present invention there is provided an articulated forklift truck comprising a rear chassis section having a rear pair of ground-engaging wheels on a first substantially common axis, a front chassis section pivoted to the rear chassis section about a substantially vertical axis and having a front pair of ground-engaging wheels on a second substantially common axis, the front chassis section carrying a mast and lift forks, and steering means for turning the front chassis section relative to the rear chassis section, the truck further including means for driving both front wheels and one only of the rear wheels.

BRIEF DESCRIPTION OF THE DRAWINGS

An embodiment of the invention will now be described, by way of example, with reference to the accompanying drawings, in which.

DETAILED DESCRIPTION OF THE PREFERRED EMBODIMENT

Figure 1:
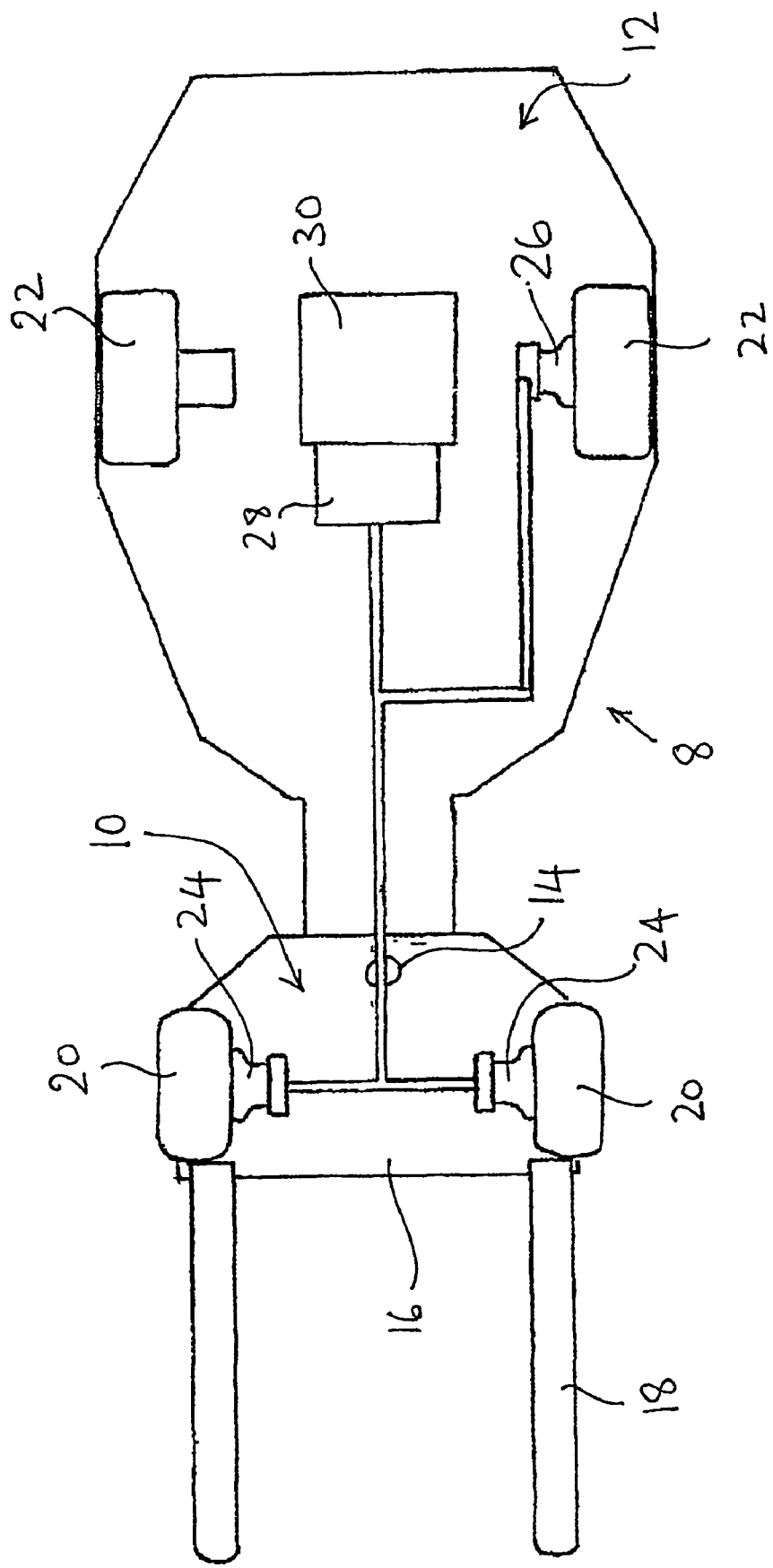
FIG. 1 is a schematic plan view of a narrow-aisle articulated forklift truck according to the invention in the straight-ahead position.

Referring to the drawings, an articulated forklift truck 8 comprises front and rear chassis sections 10, 12 respectively. The rear chassis section 12 is pivotable about a vertical shaft 14 fixed to the front chassis section 10. The truck also includes a conventional powered steering mechanism, not shown, which allows the vehicle operator, who is seated on the rear chassis section 12, to steer the truck by turning the front chassis section 10 left or right through up to 90° relative to the rear chassis section 12.

The front chassis section 10 carries a conventional mast 16 and lift forks 18. The front chassis section 10 has a first pair of ground-engaging wheels 20 on a common axis, and the rear chassis section 12 has a second pair of ground-engaging wheels 22 on a common axis. The axis of the front wheels 20 is tiltable in a vertical plane containing said axis to accommodate irregularities in the ground over which the truck travels.

Each front wheel 20 is individually driven by a respective hydrostatic motor 24, but one only of the rear wheels 20 is individually driven by a hydrostatic motor 26 (the other rear wheel 20 is allowed to freewheel). As is well known, each motor 24, 26 has a number of pistons which operates on a cam ring to drive the respective wheel 20 or 22. A variable displacement pump 28 powered by an internal combustion engine 30 supplies hydraulic fluid to the motors 24 and 26 in known manner.

Figure 2:
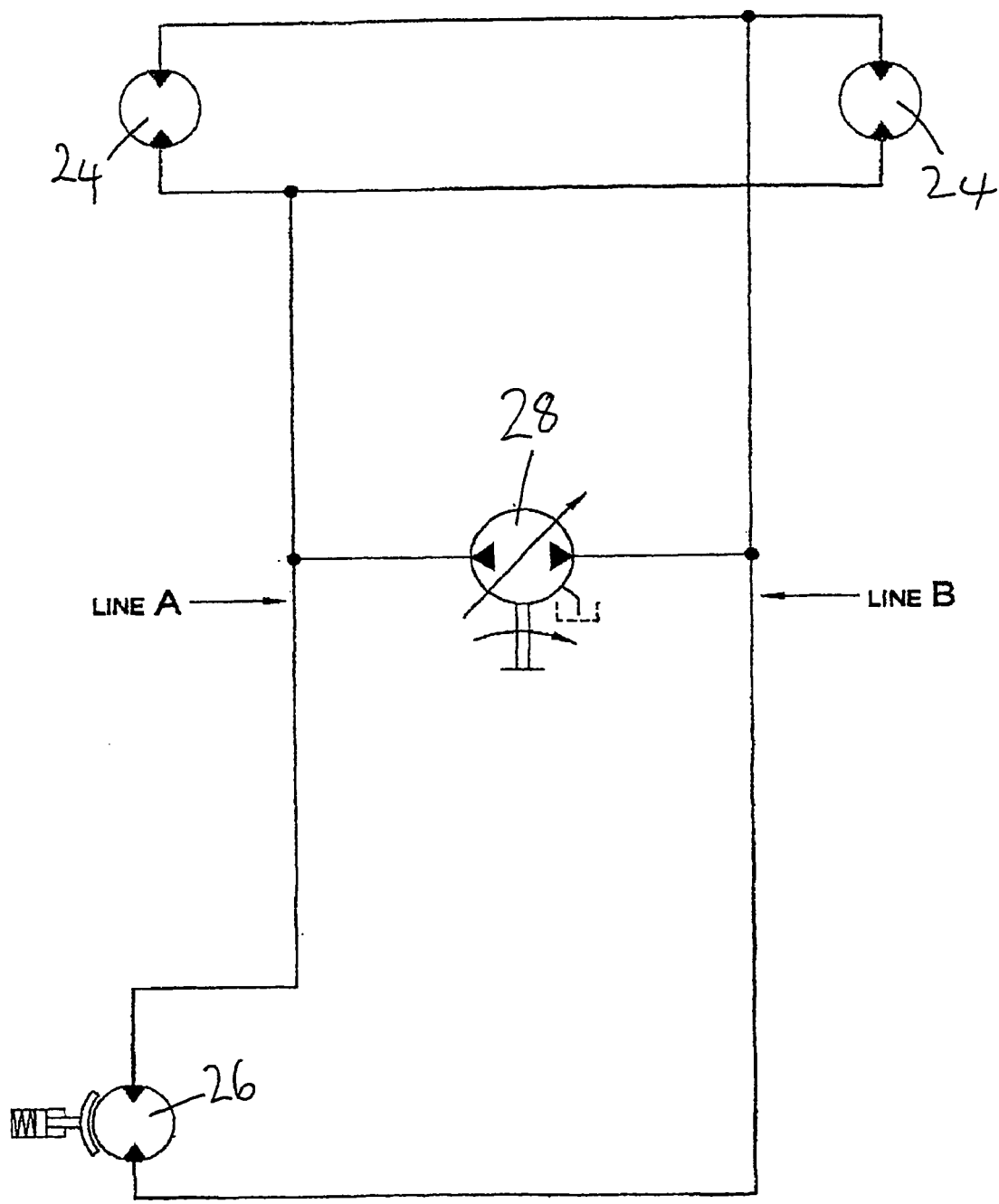
FIG. 2 is a schematic diagram of the hydraulic circuit used to drive the hydrostatic motors associated with the wheels of the truck of FIG. 1.

Referring to FIG. 2, under the control of the vehicle operator the pump 28 can be selectively operated to supply hydraulic fluid under pressure either via line A to drive all three motors, and hence all three driven wheels, simultaneously in a forward direction, or via line B to drive all three motors, and hence all three driven wheels, simultaneously in a reverse direction.

Figure 3:
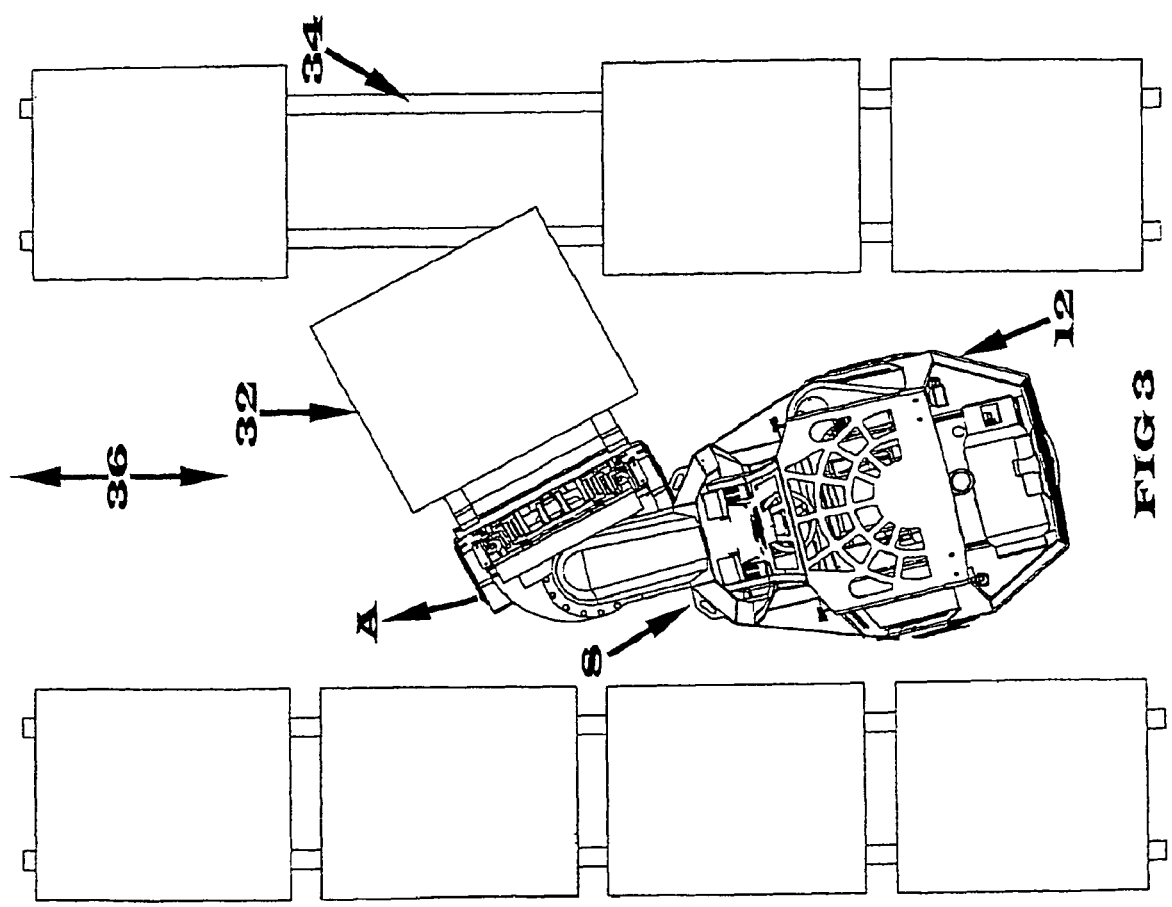
FIG. 3 is a plan view of the truck of FIG. 1 in the act of manoeuvring goods into a loading bay.
Figure 4:
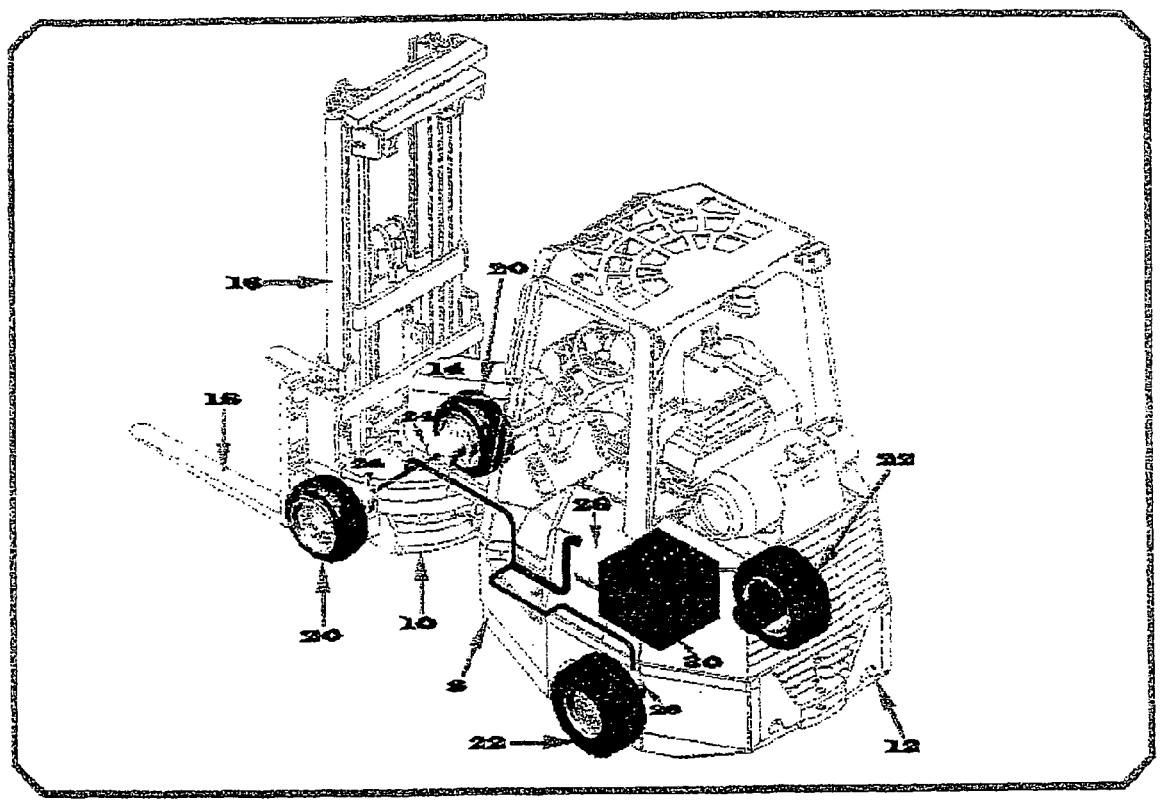
FIG. 4 is a perspective view of the truck of FIG. 1.

To manoeuvre a load 32, FIG. 3, into the loading bay 34, it is necessary to manoeuvre the forklift truck 8 such that the axis of the front wheels 20 is substantially at 90° to the axis of the rear wheels 22 in order to position the load 32 in the loading bay 34 since the aisle 36 is relatively narrow when compared with the width of the body 12.

The displacement and torque of the wheel motors 24, 26 is selected such that, when the truck is loading the goods into the loading bay as shown in FIG. 3, the supply of hydraulic fluid under pressure to line A is sufficient to rotate the front wheels 20 in a forward direction to move the load towards and into the loading bay 34. Because of the geometry of the truck one of the rear wheels, i.e. that on the inside of the path taken by the truck, may actually rotate in the reverse direction and if it is the driven wheel, such rotation will be against the force of the associated motor 26 tending to drive it forwardly.

The operation of the front and rear motors 24, 26 prevents the front wheels 20 from being forced sideways in the direction of arrow A along the aisle and increases the manoeuvrability of the forklift truck enabling goods to be loaded and unloaded in confined spaces such as narrow aisles or warehouses.

The front wheels 20 pull and steer the machine in the required direction. As hydraulic oil takes the path of least resistance it is much easier to drive the front wheels in the required direction than the back wheel to doze the front wheels forwards.

Variations of the above embodiment are possible. For example, although the embodiment uses hydrostatic motors, these could alternatively be electric motors. Also, irrespective of whether hydrostatic or electric motors are used, a single motor 24 could be used to drive the front wheels 20. This could be achieved by, for example, fitting the front wheels 20 at opposite ends of a common axle. The axle may be fitted with a differential and is driven by a motor. Then, a second motor 26 would be used to individually drive the rear driven wheel 22.

It may also be advantageous to remove the drive power to the rear motor 26 when the angle between the front and rear chassis sections 10, 12 exceeds a predetermined angle relative to the straight ahead position, for example, when the front section 10 turns through more than 45° relative to the rear section 12. This could be achieved by fixing a switch (not shown) to the rear chassis section, the switch being operated by a member fixed to the front chassis section when the latter turns more than the predetermined angle. Operating the switch would remove electric or hydraulic power, as the case may be, to the rear motor 26. This feature could be used irrespective of whether the motors are hydrostatic or electric, or whether the front wheels 20 are driven in common by a single motor or individually by separate motors.

The invention is not limited to the embodiment described herein and may be modified or varied without departing from the scope of the invention.

The invention claimed is:

1. An articulated forklift truck comprising a rear chassis section having a rear pair of ground-engaging wheels on a first substantially common axis, a front chassis section pivoted to the rear chassis section about a substantially vertical axis and having a front pair of ground-engaging wheels on a second substantially common axis, the front chassis section carrying a mast and lift forks, and steering means for turning the front chassis section relative to the rear chassis section, the truck further including driving means for driving both front wheels and one only of the rear wheels.

2. A forklift truck according to claim 1, wherein the driving means comprises a respective motor for individually driving each of the three driven wheels.

3. A forklift truck according to claim 2, wherein each motor is a hydrostatic motor.

4. A forklift truck according to claim 2, wherein each motor is an electric motor.

5. A forklift truck according to claim 2, wherein the driving means is selectively operable to drive all three driven wheels simultaneously in a forward direction or simultaneously in a reverse direction at the same time.

6. A forklift truck according to claim 5, including means to disengage the drive to the rear motor when the angle between the front and rear chassis sections exceeds a predetermined angle.

7. A forklift truck according to claim 1, wherein the driving means comprises a single motor for driving the front wheels and a further motor for individually driving the rear driven wheel.

8. A forklift truck according to claim 7, wherein each motor is a hydrostatic motor.

9. A forklift truck according to claim 7, wherein each motor is an electric motor.

* * * * *